May 20, 1930.  J. R. MARES  1,759,198
SLEEVE VALVE LUBRICATION SYSTEM
Filed May 20, 1927  4 Sheets-Sheet 1
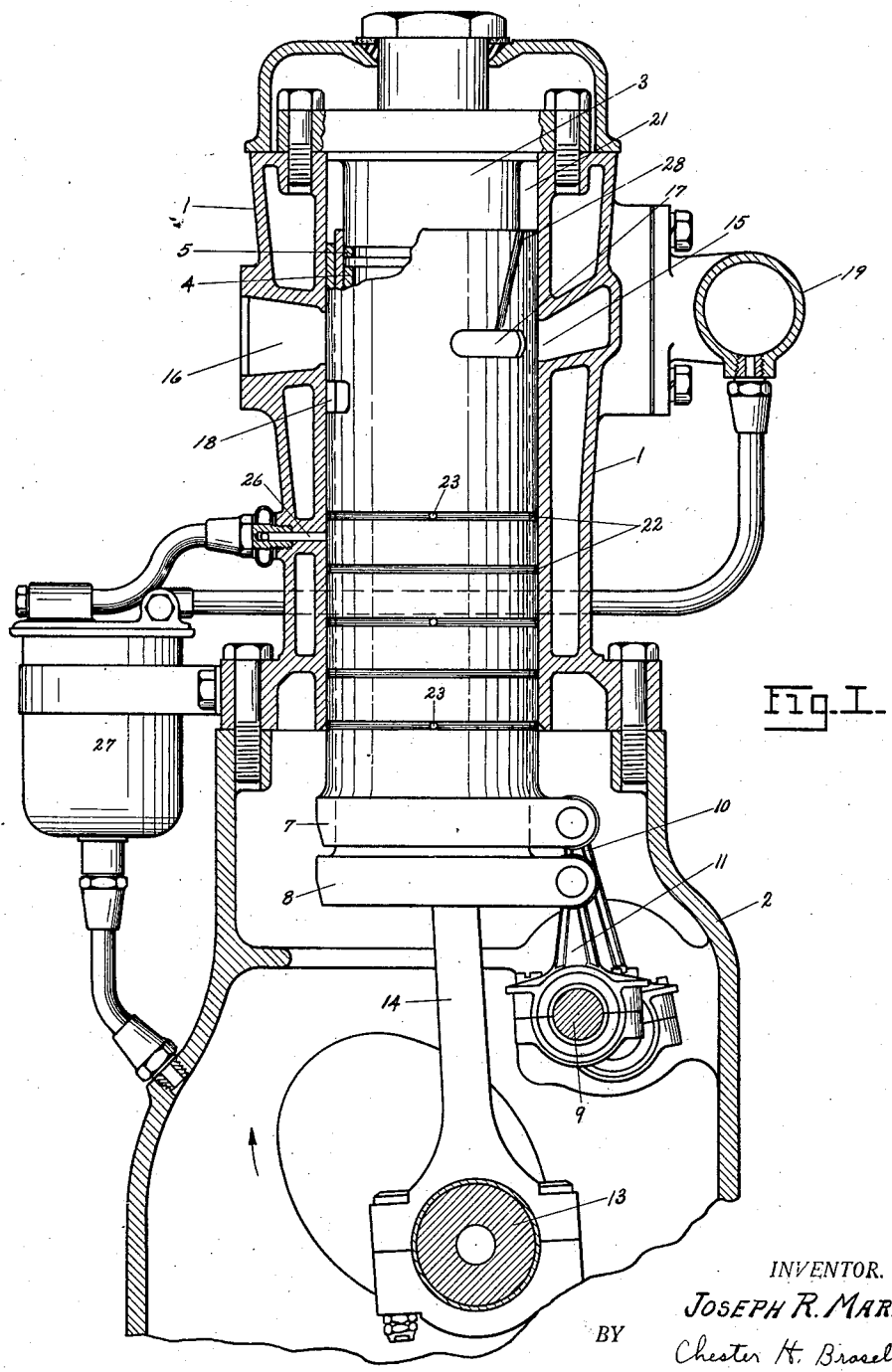
Fig. I.
INVENTOR.
JOSEPH R. MARES
BY Chester H. Braselton
ATTORNEY.

May 20, 1930.   J. R. MARES   1,759,198
SLEEVE VALVE LUBRICATION SYSTEM
Filed May 20, 1927   4 Sheets-Sheet 2
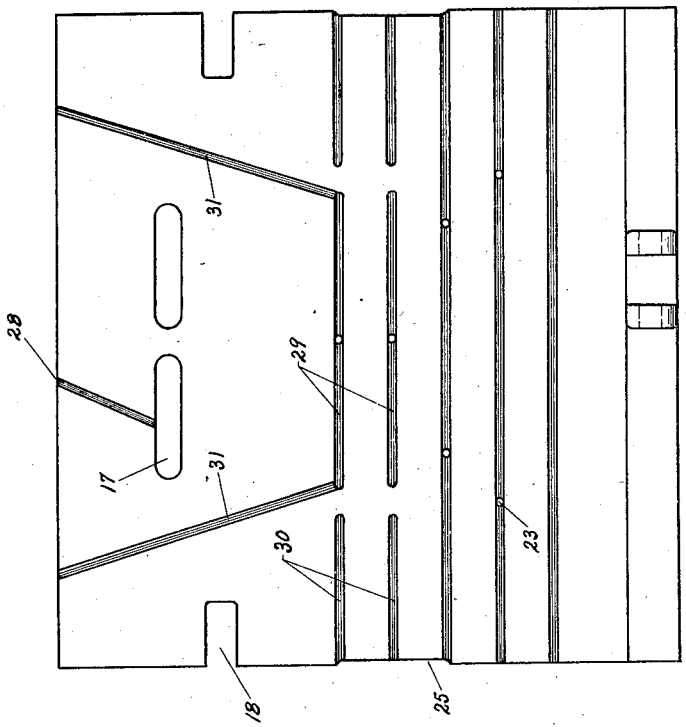
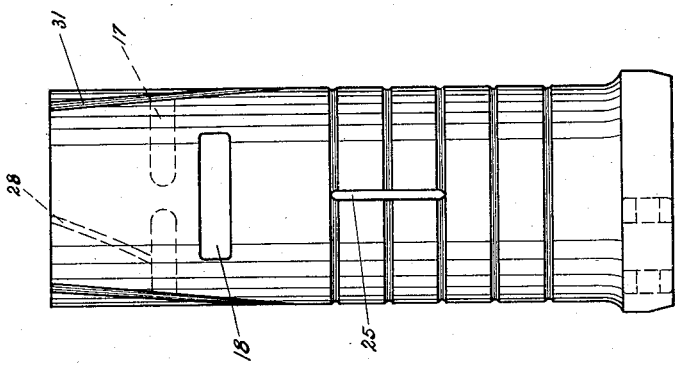
INVENTOR.
JOSEPH R. MARES
BY Chester H. Braselton
ATTORNEY.

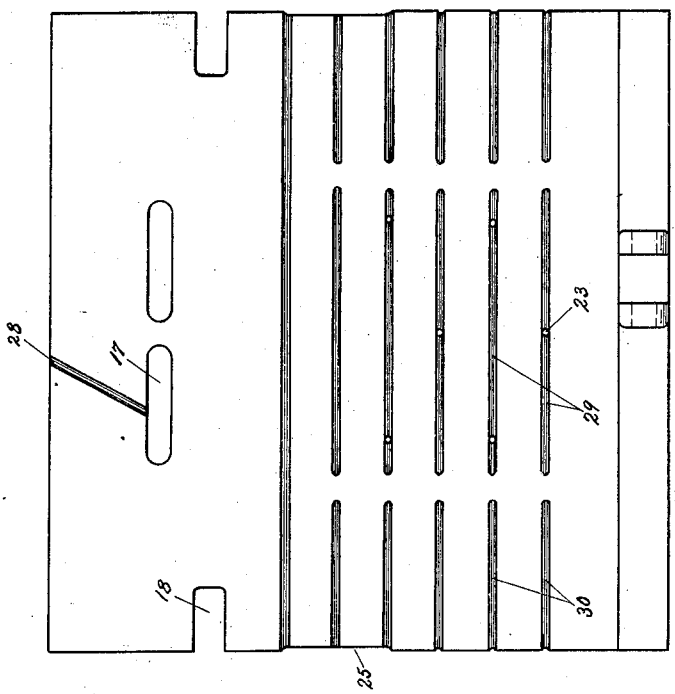
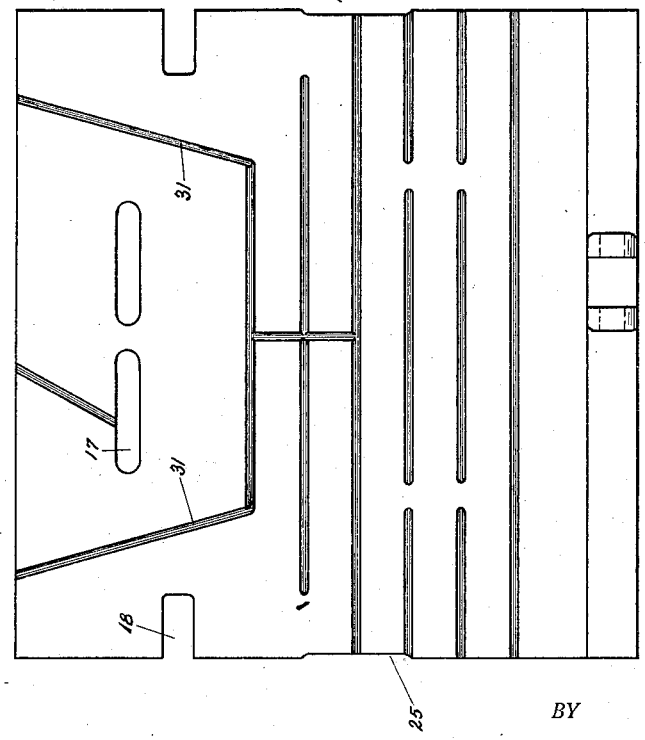

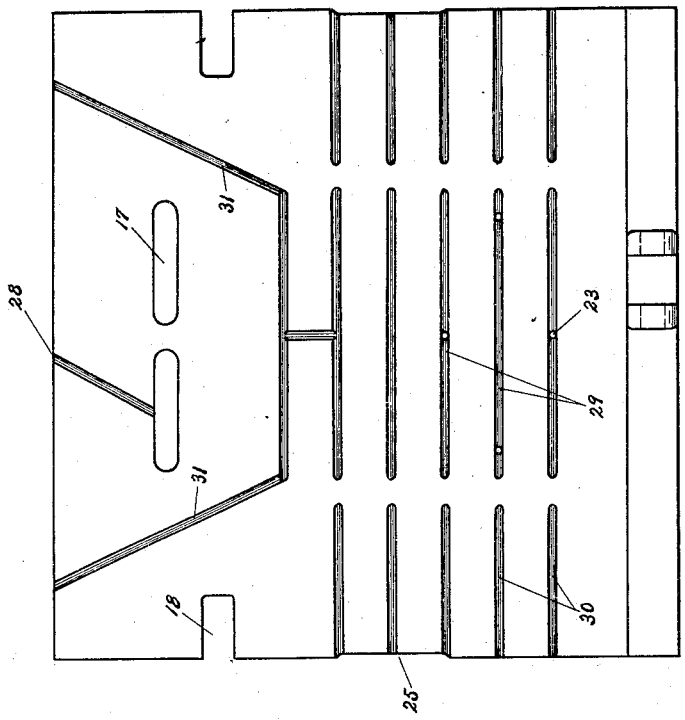

Patented May 20, 1930

1,759,198

UNITED STATES PATENT OFFICE

JOSEPH R. MARES, OF TOLEDO, OHIO, ASSIGNOR TO THE WILLYS-OVERLAND COMPANY, OF TOLEDO, OHIO, A CORPORATION OF OHIO

SLEEVE-VALVE-LUBRICATION SYSTEM

Application filed May 20, 1927. Serial No. 192,860.

My invention relates to sleeve valve engines and more particularly to those of the so-called Knight engine classification.

Among other objects the present invention contemplates the provision of a system of lubrication for the sleeves and adjoining portions of an engine by which adequate lubricant is supplied to all portions of the sleeve, and the smoke incident to over-lubrication of the intake port area of the sleeves is avoided.

A further object of the invention is to provide means for withdrawing excess oil from the surface of the sleeves, said means being disposed on the exhaust port side of the sleeve, whereby the quantities of oil withdrawn are accumulated adjacent a portion of the sleeve which is remote from the intake port. As an incidental object the present invention contemplates a lubricative system which affords a material saving in oil consumption.

Another object of the present invention is to provide a lubricative system for the sleeves and the adjoining surfaces of a sleeve valve engine, whereby sufficient oil is drawn to the upper portion of the sleeves to lubricate the compression and sealing rings, by establishing a reduced pressure zone in the region of the sleeve above the ports thereof, and disposing in cooperative relation with respect thereto and below the sleeve ports means for withdrawing any excess of lubricant which would normally make its way through the intake ports of the sleeve into the piston chamber.

It is a further object of my invention to provide a combination of elements constituting a means of lubrication by which excessive quantities of oil that normally accumulate in the vicinity of the intake port are removed therefrom and supplied to the sleeve surfaces on the exhaust port side of the engine, these being more susceptible to under-lubrication both by reason of their exposure to a more intense heat as well as the tendency of the positive pressure within the piston chamber to oppose the distribution of oil.

In order to lubricate the upper portions of the sleeves as well as the adjoining members, such as the compression ring and the cylinder wall, without drawing appreciable quantities of oil into the piston chamber, I have provided a vacuum tank mechanism, that is operated from the intake manifold of the engine, which is connected with the sleeve surfaces through the cylinder wall on the exhaust port side of the engine and below the port for the purpose of withdrawing any excess of oil. The quantity which is withdrawn is the amount of oil in excess of that required to form a film over the upper portions of the sleeves. In order that distribution of the required quantity of oil over the upper sleeve areas is realized, one may provide means whereby the normal operative pressure acting upon the upper surface is reduced thereby facilitating the upward trend of the oil.

A better understanding of my invention may be had by referring to the drawings in which Figure I is a sectional view in elevation, of a Knight engine of the conventional form, and illustrates an embodiment of the principles of my invention which may be preferred.

Fig. II is an elevational view of an outer sleeve showing a groove construction differing in some respects from that illustrated in Fig. I.

Fig. III is a development of the sleeve illustrated in Fig. II, and

Figs. IV, V, and VI are developments of outer sleeves embodying certain modifications in sleeve groove construction.

The essential elements of a Knight engine include a water jacketed cylinder 1 which is provided with a crankcase portion 2 adjacent its lower extremity and which is closed at the upper extremity by a cylinder head 3 which includes a sealing ring 4 and a compression ring 5. Within the cylinder are two reciprocating sleeves 7 and 8 which are driven by means of an eccentric shaft 9 and rods 10 and 11. The inner sleeve 8 is the working barrel of the engine within which is a piston (not shown) which is connected to a crankshaft 13 by its connecting rod 14. The cylinder is likewise provided with an inlet port 15 and an exhaust port 16, these being periodically in registration with an inlet port 17 and exhaust port 18 provided in the sleeves.

The inlet port communicates with an intake manifold 19 which is common to all of the cylinders of the engine, it being understood that the engine may include a number of independent coacting cylinders.

The customary practice in lubricating the reciprocating elements including the two sleeves and the piston, is to supply the oil thereto by means of the rapidly rotating crankshaft. The oil which engages the surface of the sleeves tends to rise upwardly between the relatively reciprocating members aided by the capillary and cohesive attraction between the oil and the metal. It will be observed that the upper portion of the cylinder, the cylinder head and the sleeves are so disposed as to form a sleeve chamber 21. The volume of the chamber varies during each cycle of operation an amount equal to the displacement of the sleeve. Under ordinary operating conditions, it has been found that the pressure within this chamber is always positive and at high speeds has been found to exceed thirty pounds per square inch. By reason of this excessive pressure the tendency for the oil to rise to the upper portions of the sleeve is materially impaired, particularly when the sealing rings adjacent the exhaust ports allow an excessive quantity of exhaust gas or "blow-by" to pass into the sleeve chamber.

The sleeves which I employ in practicing my invention may be of the conventional design, being provided with a plurality of transverse spaced oil grooves 22 extending around the outer surface of each sleeve. These grooves function to distribute the oil evenly over the surface. In addition to the oil grooves it is customary to provide a plurality of communicating holes 23 through the outer sleeves in order to effect free passage of oil between the cylinder wall and the inner sleeve. For the purpose of withdrawing the excess oil from the relatively reciprocating surfaces, a slot 25 may be provided in the outer sleeve below its exhaust port to register with an oil withdrawal port 26, which in turn cooperates with a suction mechanism 27 that removes the oil by way of the port and discharges the same periodically into the crankcase. By means of the slot better communication is had with the inner sleeve than would otherwise be possible through the oil communicating holes alone.

As has already been stated, an excessive quantity of oil on the lower portion of the sleeve has been found indispensible in order that the upper portion of the sleeve would receive its required amount. By removing the entire excess from the sleeve below the port it becomes necessary to provide means which will facilitate the upward travel of the oil necessary for the surface above the ports. This has been provided in the form of a suction mechanism by which the pressure in the sleeve chamber which would hinder the upward travel is reduced. To this end a communicating passage is provided between the chamber and the intake manifold. Such a passage may take the form of a tube extending through the chamber to the manifold 19 or an internal passage such as a slot or channel 28 in the outer sleeve. A slot is provided in the sleeves illustrated in Figs. I, II, III, V, and VI.

In order that an even distribution of oil may be realized and at the same time sufficient oil may be provided for the upper portion of the sleeve, the grooves or channels for distributing the oil may be made in sections. For example, in Fig. III the three lowermost grooves extend around the sleeve, whereas the upper two are segmental grooves, the segments 29 below the intake ports being independent of the segments 30 below the exhaust ports which are in direct communication with the vacuum tank 27. By this means the oil which passes the third groove and continues upwardly into the area served by the segmental grooves below the intake port oil will not be drawn into the oil vacuum tank, but will rather tend to continue to rise upwardly and lubricate the upper portion of the sleeve by way of inclined grooves 31. A similar result is attained in the modifications illustrated in Figs. IV, V and VI, wherein several of the oil distributing grooves are formed in segments. It will be noted that certain of the grooves are formed sufficiently close to the exhaust port as to receive a quantity of combustion cylinder gas or "blow-by". Obviously the gas which enters the channels in this manner will be drawn either into the oil sucking mechanism 27 or into the sleeve chamber 21, carrying with it any accumulation of oil within the groove.

The inner sleeve may be of the conventional Knight sleeve construction consisting of a plurality of parallel transverse grooves completely encircling the outer surface. As a modification the inner sleeve may include a longitudinal groove which extends from the lower extremity to the upper end, thereby establishing communication with the sleeve chamber, which is maintained at a reduced normally operative pressure. The latter construction aids the upward travel of the oil between the two sleeves and thereby supplies a greater quantity of oil than would otherwise be possible.

A preferred combination of inner and outer sleeves would include an outer sleeve having an arrangement of grooves such as is illustrated in Figs. IV or V for example, and having an inner sleeve in which the arrangement resembles that illustrated in Fig. VI. Obviously the inner sleeve would be constructed without the slot 25. Furthermore, the holes 23 for the inner sleeve are restricted to that portion of the sleeve which at no time forms a portion of the piston chamber. The reason for this restriction is obvious. It will be observed that the above combination includes an outer sleeve in which the grooves are in more or less direct communication with the oil trap 27 and would therefore furnish only a limited quantity of oil for the upper portion of the sleeve. The inner sleeve, on the other hand, has two distinct groove areas, one of which is in communication with the oil trap by way of the slot 25 in the outer sleeve, whereas the other sleeve area communicates with the upper areas of the sleeves by means of the inclined channels 31. This combination is only one of many which may be selected to advantage in arriving at the objects of the present invention. Others will be apparent to those skilled in the art and will be found to possess common advantages previously enumerated. In each instance, they will be found to involve a combination wherein a portion of the oil which would normally make its way to the intake port area is drawn therefrom and into the exhaust port area where it is utilized to advantage. A quantity of the oil reaches the upper extremities of the sleeve, the flow of which in the upwardly direction may be facilitated by the inclined grooves 31 as well as a reduced pressure in the sleeve chamber.

It will be observed that by means of the present invention there is provided an oiling system in which the excess of oil is drawn away from the intake port into the region of the exhaust port and is there removed without danger of entering the combustion chamber. It will also be observed that the invention enables one to remove the excess of oil which is present below the ports of the sleeves and at the same time realize adequate lubrication of the upper portion of the sleeves by reducing the pressure in the sleeve chambers, which normally opposes the upward travel of the oil.

Although the principles of the invention have been described as they apply to the several modifications illustrated, it will be apparent to those skilled in the art that the principles are not limited to the specific embodiments disclosed, but may be extended to many modifications which fall within the scope of the invention, and I desire therefore that the invention be limited only to accord with the prior art and the appended claims.

I claim:

1. In an internal combustion engine of the sleeve valve type, a sleeve having intake and exhaust ports, means for supplying the lubricant to the surface thereof, and suction means to remove excess lubricant from the surface of the sleeve, said means being disposed to withdraw the fluid from the exhaust port side of the sleeve.

2. In a sleeve valve engine of the Knight class an inner and outer sleeve each having intake and exhaust ports, means for supplying a lubricant to the surfaces thereof, and suction means disposed below the exhaust port of the outer sleeve for removing excess oil accumulated on the surface of said sleeves.

3. In a sleeve valve engine of the Knight class wherein a cylinder having an intake manifold, a cylinder head and inner and outer sleeves, each with intake and exhaust ports, are disposed cooperatively to form a sleeve chamber, a lubricative system for the sleeves comprising means for supplying a lubricant to the sleeve surfaces, means cooperatively disposed adjacent the exhaust port of the sleeves for removing an excess of lubricant on the surfaces of the sleeve, and means for maintaining a normally reduced pressure within the chamber.

4. In a sleeve valve engine of the Knight class wherein a cylinder having an intake manifold, a cylinder head and an inner and outer sleeve, each having intake and exhaust ports, are disposed in operative relation to form a sleeve chamber, a lubricative system for the sleeves comprising means for supplying a lubricant to the sleeve surfaces, means cooperatively disposed adjacent the exhaust port of the sleeves for removing an excess of lubricant on the surface of the sleeves, and a communicating passage between the intake manifold and the chamber for maintaining a normally reduced pressure within the chamber thereby facilitating the upward passage oil.

5. In a sleeve valve engine of the Knight class wherein a cylinder having an intake manifold, a cylinder head, an inner valve sleeve and a slotted outer sleeve each provided with intake and exhaust ports are disposed in cooperative relation to form a sleeve chamber, a lubricative system for the sleeves comprising means for supplying a lubricant to the sleeve surfaces, means cooperatively disposed with respect to a slot adjacent the exhaust port of the outer sleeve for removing excess of lubricant from the surfaces of the sleeve, said sleeve chamber being rendered communicative with the intake manifold whereby a reduced normally operative pressure is established within said chamber.

6. In a sleeve valve engine of the Knight class wherein a cylinder having an intake manifold, a cylinder head and an inner and outer sleeve, each having intake and exhaust ports, are disposed in operative relation to form a sleeve chamber, a lubricative system for the sleeves comprising means for supplying a lubricant to the sleeve surfaces, external suction means co-operative with the exhaust side of the sleeve for withdrawing oil from adjacent the intake port toward the opposite side of the sleeve, and means for establishing a reduced normally operative pressure on the surface of the sleeves above the sleeve ports.

7. In an internal combustion engine of the sleeve valve type embodying a sleeve having intake and exhaust ports, a lubricative system for said sleeve comprising means for supplying a lubricant to the surface thereof, suction means to withdraw excess lubricant from the surface of the sleeve, said means being located below the exhaust port of the outer sleeve, and means for establishing a reduced normally operative pressure on the surface of the sleeves below the sleeve ports.

8. In an internal combustion engine of the sleeve valve type embodying a sleeve having intake and exhaust ports, and having at least two sets of aligned segmental grooves, one set being positioned below the intake port and another of said sets being positioned below the exhaust port, a lubricative system for said sleeve comprising means for supplying a lubricant to the surface thereof, and means disposed on the exhaust side of the sleeve for removing excess lubricant thereon.

9. In an internal combustion engine of the sleeve valve type embodying a sleeve having intake and exhaust ports, and having at least two sets of aligned segmental grooves, one set being positioned below the intake port, and another of said sets being positioned below the exhaust port, a lubricative system for said sleeve comprising means for supplying a lubricant to the surface thereof, means disposed on the exhaust side of the sleeve for removing excess lubricant thereon, and means for establishing a reduced normally operative pressure on the surface of the sleeve below the ports.

In testimony whereof, I affix my signature.

JOSEPH R. MARES.